June 11, 1963   S. G. HOOKER ETAL   3,093,361
ENGINES
Filed July 2, 1959
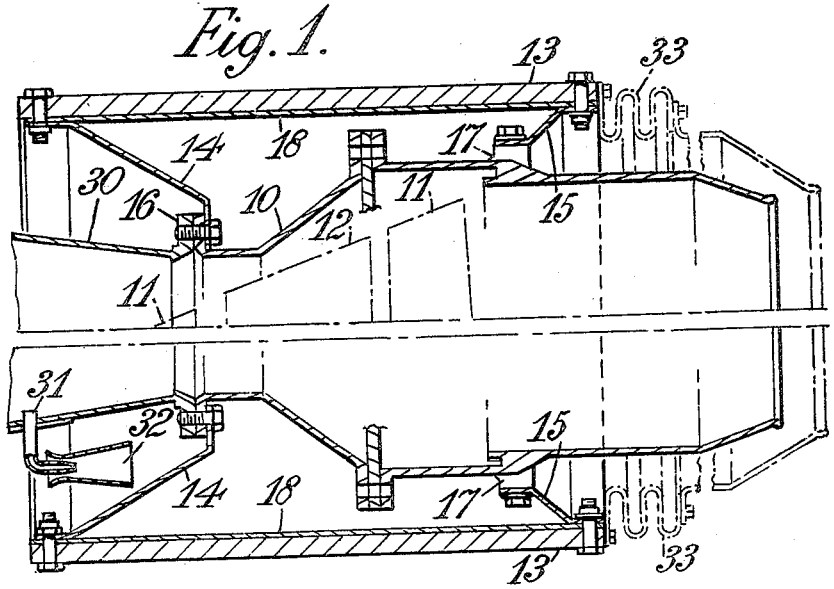
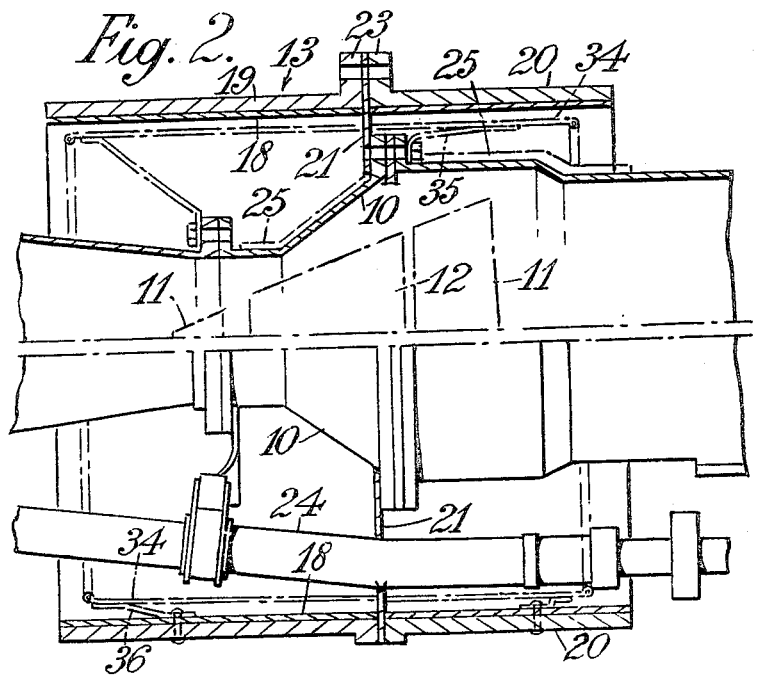
INVENTOR
STANLEY GEORGE HOOKER ET AL
BY Mawhinney & Mawhinney
ATTYS.

United States Patent Office 3,093,361
Patented June 11, 1963

3,093,361
ENGINES
Stanley George Hooker and Francis Charles Ivor Marchant, Bristol, England, assignors to Bristol Siddeley Engines Limited, Bristol, England, a British company
Filed July 2, 1959, Ser. No. 824,515
Claims priority, application Great Britain July 7, 1958
6 Claims. (Cl. 253—39)

This invention relates to engines of the kind which have parts which during operation of the engine move at a speed and in a manner such that if they become detached during operation of the engine they would be projected against the engine casing and might penetrate the engine casing and move off at high speed.

As an example of such an engine there may be cited a gas turbine engine, the turbine blades of which, if they break away during operation, are quite capable of penetrating the engine casing and escaping at high speed.

Needless to say, the consequences of such an occurrence can be dangerous especially where the engine is a gas turbine engine employed to propel an aircraft.

According to one aspect of the invention there is provided an engine having a casing and parts within the casing capable of moving at great speed during operation in such a manner that if they become detached during operation of the engine they would be projected against the casing and could penetrate the casing and escape therefrom and a resiliently mounted shield surrounding at least a portion of the casing and enclosing said parts. Preferably the shield is made from a material which does not splinter when struck by an escaping part such as e.g. glass fibre reinforced resin.

According to another aspect of the invention there is provided a gas turbine engine having a casing; at least one rotor within the casing, said rotor having rotor blades at its periphery, and a substantially tubular shield surrounding the casing and enclosing the rotor, said shield being radially spaced from and resiliently carried by said casing by parts in effect constituting a skeletonized framework which is open and does not impede the passage of air therethrough.

According to a further aspect of the invention there is provided a gas turbine engine comprising a casing; at least one rotor within said casing; rotor blades on said rotor; two series of angularly spaced bent fingers, the fingers of one series being axially spaced from the fingers of the other series and the inner ends of the fingers being attached to said casing; and a tubular shield made of resin reinforced with glass fibres, which shield is carried on the outer ends of said fingers and is radially spaced outside said casing surrounding the rotor, said shield having an inner lining to protect the shield from the heat of the engine.

According to yet another aspect of the invention there is provided a gas turbine engine comprising a multi-part casing having at least one pair of casing flanges bolted together to join two parts; at least one rotor within said casing; rotor blades carried by said rotor at its periphery; a series of approximately triangular shaped steel plates each connected at one corner to said casing flanges; and a two-part tubular shield made of resin reinforced with glass fibres and having a heat-resisting lining on its inner surface which shield is radially spaced outside the casing surrounding the rotor and which comprises a pair of shield flanges whereby the shield parts are joined, the bases of said plates being received between said shield flanges to support said shield.

FIGURE 1 and FIGURE 2 of the accompanying drawings illustrate, by way of example only, embodiments of the present invention.

In the drawings:
FIGURE 1 is a sectional elevation of that part of the casing of a gas turbine engine which encloses the turbine system of the engine, and shows in section a shield in accordance with the invention resiliently mounted on the engine casing, and FIGURE 2 is a part sectional elevation of that part of the casing of a gas turbine engine which encloses the turbine system of the engine, and also shows, in section, a shield in accordance with the invention resiliently mounted on the engine casing, but in a different manner to that shown in FIGURE 1.

Referring to FIGURE 1, the engine casing has a part, generally indicated at 10, which encloses two rings of rotor blades 11 and an intermediate ring of stator blades 12, the position of the blade rings being indicated in chain lines in the upper part of FIGURE 1.

The turbine rotors rotate at high speed and if a blade 11 or a part thereof fractures it may be projected through the casing part 10 under centrifugal force. If there is nothing to contain the escaping projectile or at least to slow it down considerably it may do considerable damage outside the casing and this may be especially likely in the case of aircraft engines where for consideration of weight the casing is made as light and thin as possible. Accordingly a substantially tubular shield 13 is provided outside the casing so as to surround the part 10 of the casing and intercept any parts of the rotors which may fracture and be projected through the casing. The shield 13 is radially spaced from the casing and resiliently mounted thereon by means of two series of angularly spaced, bent steel fingers 14, 15 which are bolted to the end portions of the shield. The inner portions of the fingers 14 are bolted to flanges 16 on the casing and the inner portions of the fingers 15 are likewise secured to projections 17 formed on the casing. The mounting of the shield in this manner permits the resilient steel fingers 14, 15 to bend when the shield is struck by an escaping projectile and allow the shield to yield slightly with the impact, thus offering greater effective resistance to penetration by the projectile.

In order to increase further the resistance to penetration the shield is made, as hereinafter described, of a material which does not splinter on impact, for example glass-fibre reinforced resin.

The engine shield may be made as follows:
The primary material of the shield, glass fibres, is woven into the form of a cloth. This cloth is impregnated with a phenolic resin, usually of the thermosetting type, and thereafter wound circumferentially around a former given continuous strands of fibre glass. The resin is then set. Alternatively, the glass fibres can be knitted into shaped stocking-like members which may be impregnated as described above and stretched successively in layers on a former to the required thickness of shield, again to give continuous strands of glass fibres for increased strength of shield.

Suitable attachment points for the means for carrying the shield, e.g. steel fingers 14, 15 may be moulded on to the shield. Alternatively the steel fingers may be riveted or moulded to the shield.

An inner lining 18 of heat-resisting material such as for example aluminum foil protects the resin from the heat of the turbine.

The projecting type of mounting represented by the steel fingers 14, 15 demands that the shield 13 is spaced from the turbine casing 10. An inducer system is provided having a tapping connection 31 with a pressure source of the engine which discharges into the throat of a venturi 32, mounted on the casing 30, thereby inducing additional air through the venturi and causing a stream of cooling air to be passed between the shield and the casing in order to insulate the shield and to cool the casing. Alternatively an inducer nozzle as shown by chain dotted lines may be attached through a flexible member 33 to the shield 13 at the shield end nearer the turbine outlet nozzle. The jet efflux from the jet nozzle of the gas turbine engine will entrain cooling air to flow rearwardly between the shield and the casing 10.

In the arrangement of FIGURE 2, the shield 13 comprises two parts 19, 20 bolted together and made from glass fibre reinforced resin. The shield 13 is provided with a heat-resisting lining 18 in the form of a suitably polished sprayed metal coating of steel or light alloy. The turbine shield 13 is resiliently mounted on the engine casing by means of an annular series of spaced steel plates 21 which may be of approximately triangular shape and which are bolted at their inner ends to flanges 22 provided on adjacent portions of the casing. At their outer ends the plates are bolted between adjacent flanges 23 of the shield parts 19, 20. In this example also, the type of mounting for the shield 13 demands that the latter is radially spaced from the casing 10. When the shield is struck by an escaping projectile such as a fractured turbine rotor blade, the resilient steel plates 21 bend to permit the shield to yield with the impact and thus offer greater effective resistance to penetration.

The lower part of FIGURE 2 shows the casing in elevation but the shield is sectioned in order to illustrate how advantage may be taken of the radial spacing of the shield to pass a member, such as a fuel drainaway pipe 24, between the shield and the casing.

This embodiment may also be provided with air inducing means similar to those described in the first embodiment for causing cooling air to flow between the engine casing and the turbine shield.

If desired the casing may be provided with lagging 25 or the like as indicated in the upper part of FIGURE 2 but this will retard the escape of heat from the casing.

It will be seen that the radially spaced shield, preferably assisted by a flow of cooling air between the casing and the shield, also constitutes a heat shield to protect adjacent external members from the turbine heat.

Instead of lining the engine shield with heat-resisting material as shown, a radiation sleeve of heat-resisting material may be mounted between the shield and the engine casing but spaced therefrom. Two examples of how this sleeve may be mounted are shown in chain dotted lines in FIGURE 2, where the sleeve 34 is shown spaced from the shield 13 and the engine casing. The sleeve may be mounted on flexible steel fingers 35 bolted to the engine casing. Alternatively the sleeve may be mounted on flexible steel fingers 36 riveted to the turbine shield 13.

The engine shield may be resiliently mounted on a structure surrounding the relevant portion of the engine casing insead of being mounted on the engine casing.

In order to permit the shield to conform more closely in general outline with that part of the engine casing which it is to surround, its form may be shaped accordingly. For example with respect to FIGURE 2, the radially spaced shield could comprise a frusto-conical section followed by a cylindrical section.

We claim:
1. A gas turbine engine comprising an engine casing, a rotor mounted within the engine casing and having rotor blades mounted thereon, a tubular shield encircling the engine casing in radially spaced relation thereto at the location of the rotor blades, and an open work resilient mounting means for resiliently mounting said shield on the engine casing, said mounting means being open for passage of air axially between the casing and shield and including resilient portions bridging the space between the casing and shield connected adjacent opposite extremities to said casing and said shield, respectively.

2. A gas-turbine engine comprising an engine casing, a rotor mounted within the engine casing and having rotor blades mounted thereon, a tubular shield encircling the engine casing in radially spaced relation thereto at the location of the rotor blades, and resilient mounting means by which the shield is resiliently mounted on the engine casing, said resilient mounting means comprising two series of resilient bent fingers axially spaced from one another, each series comprising a number of angularly spaced bent fingers connected adjacent their ends to said casing and said shield, respectively.

3. A gas turbine engine comprising an engine casing, a rotor mounted within the engine casing and having rotor blades mounted thereon, a tubular shield encircling the engine casing in radially spaced relation thereto at the location of the rotor blades, and resilient mounting means by which the shield is resiliently mounted on the engine casing comprising an annular series of spaced approximately triangular shaped resilient plates each connected at one corner to the turbine casing and at two corners to the shield to carry said shield on said casing, the resilient plates being contained in substantially a common plane which extends transversely of the axis of rotation of the rotor and which is offset from the said rotor blades.

4. A gas turbine engine comprising an engine casing, a rotor mounted within the engine casing having rotor blades thereon, a generally tubular normally self shape-sustaining shield consisting primarily of non-splintering synthetic resin reinforced with glass fibre, said shield encircling said engine casing at the location of the rotor blades with its inner surface portion in radially spaced relation thereto and exposed to said casing and openwork resilient mounting means by which the shield is resiliently mounted on the engine casing, said mounting means being open for passage of air axially between the casing and shield and including resilient portions bridging the space between the casing and shield connected adjacent opposite extremities to said casing and said shield, respectively.

5. A gas turbine engine according to claim 4, wherein said shield has heat-resisting material confronting said inner surface portion.

6. A gas turbine engine according to claim 4 wherein said shield has a heat-resisting coating on its inner surface.

References Cited in the file of this patent
UNITED STATES PATENTS

| | | |
|---|---|---|
| 1,634,897 | Davis | July 5, 1927 |
| 2,469,732 | Kalitinsky | May 10, 1949 |
| 2,631,796 | Williamson | Mar. 17, 1953 |
| 2,634,090 | Hardigg | Apr. 7, 1953 |
| 2,638,743 | Feilden | May 19, 1953 |
| 2,640,319 | Wislicenus | June 2, 1953 |
| 2,643,085 | Durkin et al. | June 23, 1953 |
| 2,652,216 | Hoffman | Sept. 15, 1953 |
| 2,738,647 | Hill | Mar. 20, 1956 |
| 2,801,518 | Wosika et al. | Aug. 6, 1957 |
| 2,835,107 | Ward | May 20, 1958 |
| 2,858,104 | Kelk et al. | Oct. 28, 1958 |
| 2,879,936 | Faught | Mar. 31, 1959 |
| 2,999,667 | Morley | Sept. 12, 1961 |

FOREIGN PATENTS

| | | |
|---|---|---|
| 326,309 | Switzerland | Jan. 31, 1958 |